United States Patent
Steffes

(10) Patent No.: US 12,214,728 B2
(45) Date of Patent: *Feb. 4, 2025

(54) VEHICULAR EXTERIOR REARVIEW MIRROR ASSEMBLY

(71) Applicant: Magna Mirrors of America, Inc., Holland, MI (US)

(72) Inventor: Matthew V. Steffes, Grand Rapids, MI (US)

(73) Assignee: Magna Mirros of America, Inc., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/543,039

(22) Filed: Dec. 18, 2023

(65) Prior Publication Data

US 2024/0116444 A1    Apr. 11, 2024

Related U.S. Application Data

(63) Continuation of application No. 17/658,875, filed on Apr. 12, 2022, now Pat. No. 11,845,383.

(60) Provisional application No. 63/201,112, filed on Apr. 13, 2021.

(51) Int. Cl.
*B60R 1/078* (2006.01)
*B60R 1/07* (2006.01)

(52) U.S. Cl.
CPC ............... *B60R 1/078* (2013.01); *B60R 1/07* (2013.01)

(58) Field of Classification Search
CPC .. B60R 1/02; B60R 1/06; B60R 1/062; B60R 1/07; B60R 1/074; B60R 1/078; B60R 1/12; B60R 1/1207; B60R 2001/1253

USPC .... 248/475.1, 476, 480, 466, 479, 485, 486; 359/841, 877, 872, 873, 881, 876

See application file for complete search history.

(56) References Cited

U.S. PATENT DOCUMENTS

| | | | |
|---|---|---|---|
| 5,483,385 A | 1/1996 | Boddy | |
| 6,116,743 A | 9/2000 | Hoek | |
| 6,213,609 B1 | 4/2001 | Foote et al. | |
| 6,239,928 B1 | 5/2001 | Whitehead et al. | |
| 6,276,805 B1* | 8/2001 | Home | B60R 1/076 248/512 |
| 6,276,808 B1* | 8/2001 | Foote | B60R 1/078 248/479 |
| 6,325,518 B1* | 12/2001 | Whitehead | B60R 1/078 248/478 |

(Continued)

*Primary Examiner* — Eret C McNichols
*Assistant Examiner* — Michael McDuffie
(74) *Attorney, Agent, or Firm* — HONIGMAN LLP

(57) ABSTRACT

A vehicular exterior rearview mirror assembly includes a mirror head accommodating a mirror reflective element, a support structure configured for attachment at a side of a vehicle, and an adjustment mechanism operable to move the mirror head along the support structure between a retracted position and an extended position. A shutoff device includes a base portion and a movable portion movably disposed at the base portion. With the adjustment mechanism operating to move the mirror head along the support structure, the shutoff device stops movement of the mirror head toward the retracted position responsive to the movable portion engaging a first electrical element at a first end region of the base portion, and stops movement of the mirror head toward the extended position responsive to the movable portion engaging a second electrical element at a second end region of the base portion.

29 Claims, 8 Drawing Sheets

(56) References Cited

U.S. PATENT DOCUMENTS

| | | | |
|---|---|---|---|
| 6,394,616 B1 * | 5/2002 | Foote | B60R 1/074 |
| | | | 359/881 |
| 6,497,491 B2 | 12/2002 | Boddy et al. | |
| 6,505,943 B1 * | 1/2003 | Olijnyk | B60R 1/078 |
| | | | 359/881 |
| 6,598,983 B1 * | 7/2003 | Boddy | B60R 1/076 |
| | | | 359/872 |
| 6,755,543 B1 * | 6/2004 | Foote | B60R 1/078 |
| | | | 359/872 |
| 6,877,868 B2 | 4/2005 | Olijnyk et al. | |
| 7,159,992 B2 * | 1/2007 | Foote | B60R 1/078 |
| | | | 248/480 |
| 7,165,853 B2 * | 1/2007 | Gilbert | B60R 1/1207 |
| | | | 359/881 |
| 7,267,449 B1 | 9/2007 | Boddy et al. | |
| 7,287,867 B2 | 10/2007 | Wellington et al. | |
| 7,303,294 B1 | 12/2007 | Ruse et al. | |
| 7,441,911 B2 | 10/2008 | Ruse et al. | |
| 7,540,619 B2 | 6/2009 | Henion | |
| 7,594,731 B2 | 9/2009 | Sinelli et al. | |
| 7,748,857 B2 | 7/2010 | Fimeri et al. | |
| 8,915,601 B2 | 12/2014 | Foote et al. | |
| 9,057,833 B2 * | 6/2015 | Bowers | G02B 7/182 |
| 9,796,334 B2 | 10/2017 | Peterson et al. | |
| 9,827,913 B2 | 11/2017 | De Wind et al. | |
| 9,862,321 B2 | 1/2018 | Henion et al. | |
| 10,099,618 B2 | 10/2018 | Foote et al. | |
| 11,077,799 B2 | 8/2021 | Sinelli et al. | |
| 11,148,596 B2 | 10/2021 | Huizen et al. | |
| 11,358,527 B2 | 6/2022 | Wilson et al. | |
| 11,383,645 B2 * | 7/2022 | Steffes | B60R 1/074 |
| 11,718,231 B2 * | 8/2023 | Cowan | B60R 1/078 |
| | | | 248/476 |
| 11,845,383 B2 | 12/2023 | Steffes | |
| 2014/0092495 A1 | 4/2014 | Bowers et al. | |
| 2015/0224930 A1 | 8/2015 | Foote et al. | |
| 2020/0361381 A1 | 11/2020 | Steffes | |
| 2021/0213880 A1 | 7/2021 | Esser | |
| 2021/0316664 A1 | 10/2021 | Baur | |
| 2021/0323477 A1 | 10/2021 | LaCross et al. | |
| 2021/0331625 A1 | 10/2021 | Huizen et al. | |
| 2021/0370833 A1 | 12/2021 | Cowan et al. | |

* cited by examiner

VEHICULAR EXTERIOR REARVIEW MIRROR ASSEMBLY

CROSS REFERENCE TO RELATED APPLICATIONS

The present application is a continuation of U.S. patent application Ser. No. 17/658,875, filed Apr. 12, 2022, now U.S. Pat. No. 11,845,383, which claims the filing benefits of U.S. provisional application Ser. No. 63/201,112, filed Apr. 13, 2021, which is hereby incorporated herein by reference in its entirety.

FIELD OF THE INVENTION

The present invention relates generally to the field of exterior rearview mirror assemblies for vehicles and, more particularly, to extendable and retractable exterior rearview mirror assemblies for vehicles.

BACKGROUND OF THE INVENTION

It is known to provide an automotive exterior rearview mirror assembly that may be extended and retracted, such as for trailer towing applications, where the mirror assembly may be extended to provide enhanced rearward viewing to the driver of the trailer pulling vehicle. Examples of extendable and retractable mirror assemblies are described in U.S. Pat. Nos. 5,483,385; 6,116,743; 6,213,609; 6,239,928; 6,276,808; 6,325,518; 6,394,616 and/or 6,497,491, which are hereby incorporated herein by reference in their entireties.

SUMMARY OF THE INVENTION

An exterior rearview mirror assembly (configured for mounting at a side of an equipped vehicle) includes an extending/retracting mechanism and actuator that is operable to move the mirror head between a retracted position and an extended position. The exterior rearview mirror assembly includes a shutoff module or memory module disposed at the mirror head, wherein the module comprises a body or base portion attached at the mirror head and a plunger movably disposed at the body, with a distal end of the plunger attached at the support structure. As the mirror head moves relative to the support structure, an inner end of the plunger moves relative to and along a circuit element of the body of the module. The adjustment mechanism is deactivated responsive to the inner end of the plunger reaching either end of the circuit element.

Optionally, the circuit element may comprise a first micro switch at one end of the circuit element and a second micro switch at the other end of the circuit element, whereby the inner end of the plunger engages the first micro switch or the second micro switch when the mirror head is fully extended or fully retracted. The adjustment mechanism thus is automatically deactivated when either micro switch is tripped or activated by the inner end of the plunger.

Optionally, the circuit element may comprise a pair of spaced apart electrically conductive traces established along a surface of the circuit element, and the inner end of the plunger may comprise an electrically conductive element that engages and electrically conductively contacts the electrically conductive traces and moves along the electrically conductive traces as the mirror head is extended and retracted. The adjustment mechanism is deactivated and stops movement of the mirror head at a stored position between the fully extended position and the fully retracted position responsive to determination that the inner end of the plunger is at a particular location along the electrically conductive traces that is representative of or indicative of the mirror head being at the stored position.

These and other objects, advantages, purposes and features of the present invention will become apparent upon review of the following specification in conjunction with the drawings.

DESCRIPTION OF THE PREFERRED EMBODIMENTS

Figure 1:
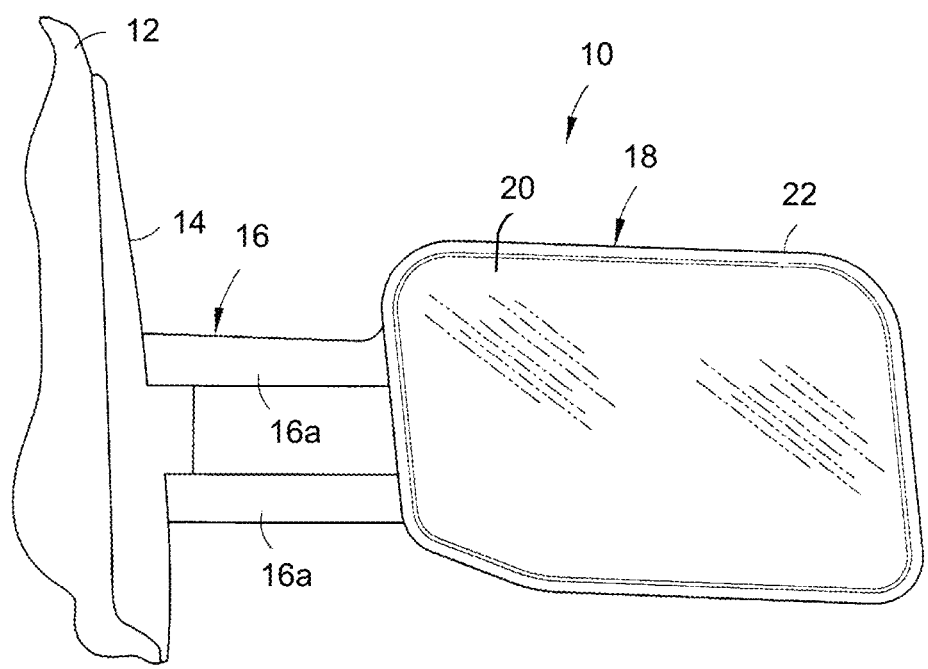
FIG. 1 is a view of an exterior rearview mirror assembly.
Figure 2:
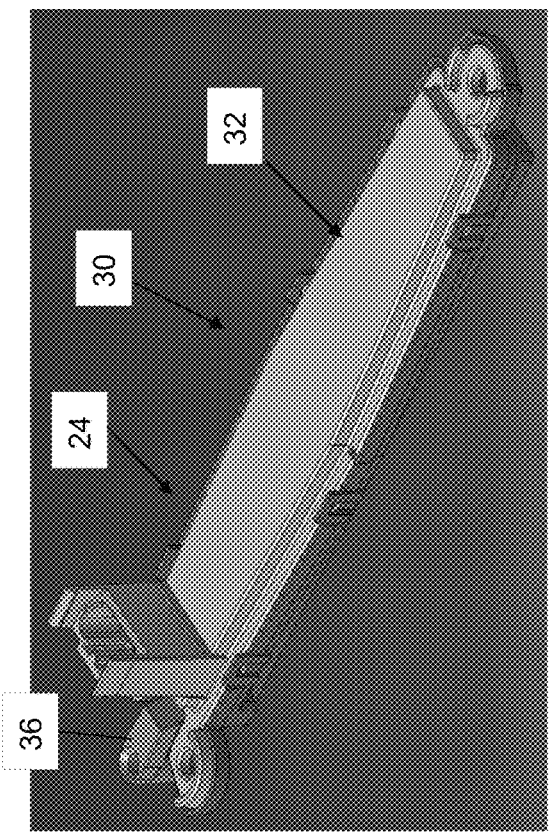
FIGS. 2 and 3 are perspective views of a shutoff module for use with an extending/retracting adjustment mechanism of the mirror assembly.
Figure 3:
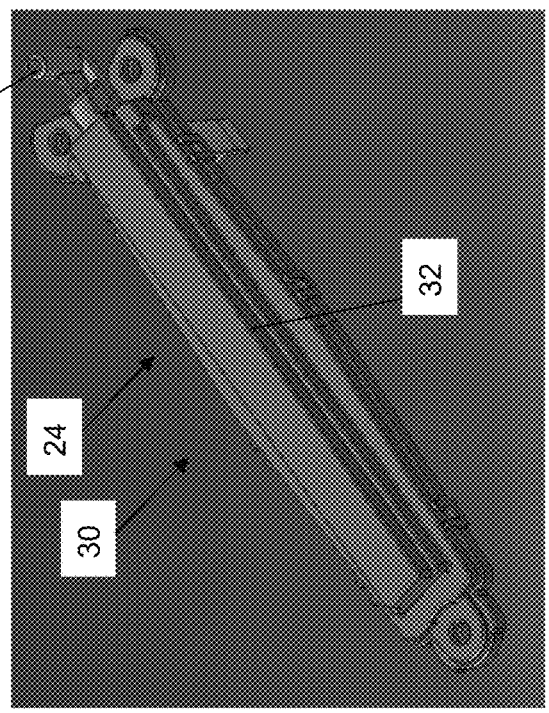

Referring now to the drawings and the illustrative embodiments depicted therein, a vehicular exterior rearview mirror assembly 10 for a vehicle 12 includes a mounting base 14 attached at the vehicle 12, with a support structure 16 extending outward from the mounting base. A mirror head 18 having a mirror reflective element 20 accommodated at a mirror shell or casing 22 is adjustably mounted at the support structure 16 of the mounting base 14 via a mirror head bracket. The mirror head is adjustably mounted at the support structure 16 and is adjustable via an adjustment mechanism or device 24 that adjusts the mirror head between a retracted state or position and an extended state or position relative to the mounting base and/or support structure of the mounting base and the side of the vehicle. Stated differently, the mirror head is movably extendable and retractable along the support structure. The mirror assembly 10 includes a shutoff module or device 30 that controls operation of an actuator or electrically operated motor of the adjustment mechanism responsive to a determined location or position of the mirror head relative to the support structure, as discussed below.

In the illustrated embodiment, the support structure 16 comprises a pair of parallel elongated support arms or tubes 16a that extend from the mounting base 14, which is configured for attachment at a side of the vehicle, such that an inboard end of the support structure is attached at the side of the vehicle. The mirror head may be movable relative to the head bracket disposed at an outboard end of the support structure that is distal from the inboard end. The support structure 16 may extend laterally from the side of the vehicle and be fixedly attached at the mounting base 14, or may be pivotally attached at the mounting base 14, whereby the mirror head and support structure may pivot relative to the mounting base between an extended or use position and a folded or stowed position (and may be manually pivoted or pivoted via an electrically operable powerfold actuator). The mounting base of the mirror assembly is mounted at the side of a host or subject vehicle, with the reflective element providing a rearward field of view along the respective side of the vehicle to the driver of the vehicle.

The adjustment mechanism may be disposed at the outboard end of the support structure and operates to move the mirror head along the support structure between the extended position and the retracted position, such as responsive to a user actuatable input in the vehicle. For example, when the vehicle is towing a trailer, the driver of the vehicle may actuate the user input to extend the mirror head outward away from the side of the vehicle to enhance the driver's rearward view along the side of the vehicle and trailer and rearward of the trailer. The adjustment mechanism operates to translationally move the mirror head along the support structure, such as by utilizing aspects of the mirror assemblies and adjustment mechanisms described in U.S. Publication No. US-2020-0361381, which is hereby incorporated herein by reference in its entirety.

The shutoff module 30 (FIGS. 2-8) provides automatic shutoff of the motor of the adjustment mechanism when the mirror head reaches either the fully extended position or the fully retracted position. The shutoff module is configured for an infinite-adjust telescoping power extend trailer tow mirror that is attached between the arm and head bracket of the mirror. The module 30 includes a body or base portion 32 (including the housing portions that house or accommodate a printed circuit board (PCB) or circuit or electrical element 34) that is rigidly attached to the mirror head or the head bracket (that moves with the mirror head relative to the support structure or alternatively is movably mounted at the support structure of the mounting base). The module also includes a sliding plunger 36 that is movably disposed at the body 32 and that is attached at a distal or outer end 36*a* to the support structure 16 (such as at a bracket at an outer or distal end of the support structure). As the mirror head extends and retracts along the support structure, the plunger 36 remains stationary relative to the support structure or arm or arms, and the body of the module moves in conjunction with the head bracket. The plunger and the module body move relative to one another, proportionally to the movement between the mirror head and arm. The body 32 includes an electrical connector 33 for electrically connecting to a connector of a wire of the adjustment mechanism or mirror head or mirror assembly (where the wire electrically connects the shutoff device to the adjustment mechanism). Alternatively, the distal end 36*a* of the plunger 36 may be attached at the mirror head (or head bracket) and the body 32 may be attached to the support structure (such as at a bracket at the distal end of the support structure), such that the body remains stationary relative to the support structure or arm or arms, and the plunger moves in conjunction with the head bracket. In such an embodiment, the adjustment mechanism may also be at the bracket of the support structure, so that electrical connection between the shutoff device and the adjustment mechanism is made at the support structure.

Figure 4:
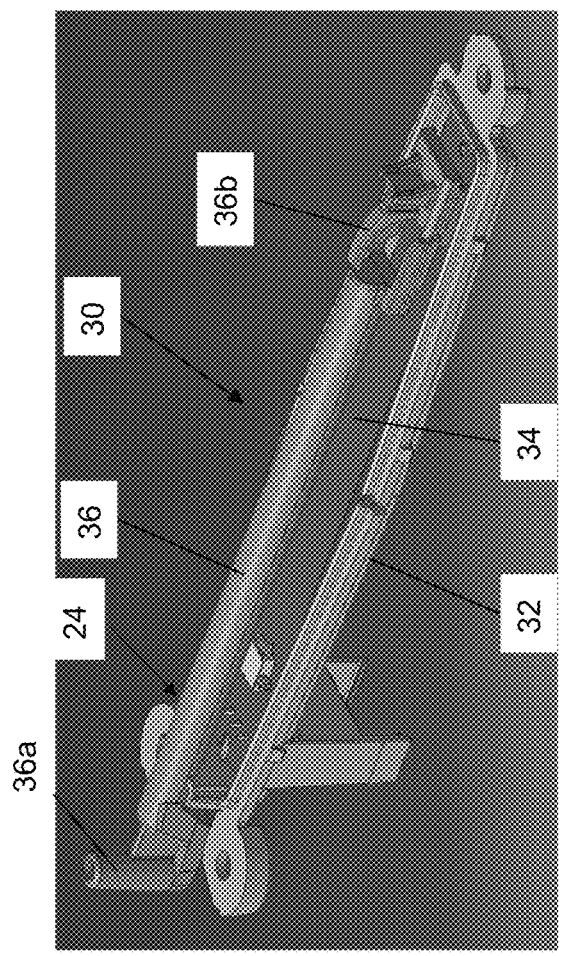
FIGS. 4 and 5 are perspective views of the shutoff module, with an upper housing portion or cover removed.
Figure 5:
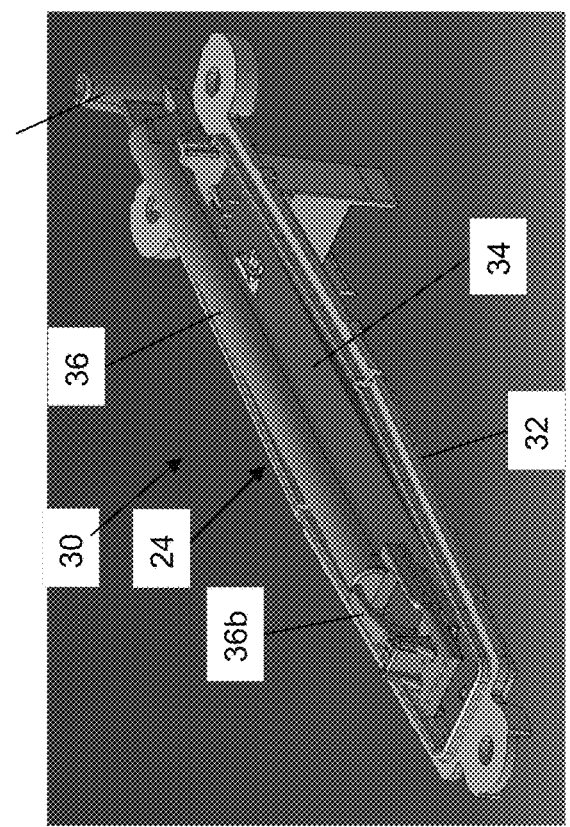
Figure 6:
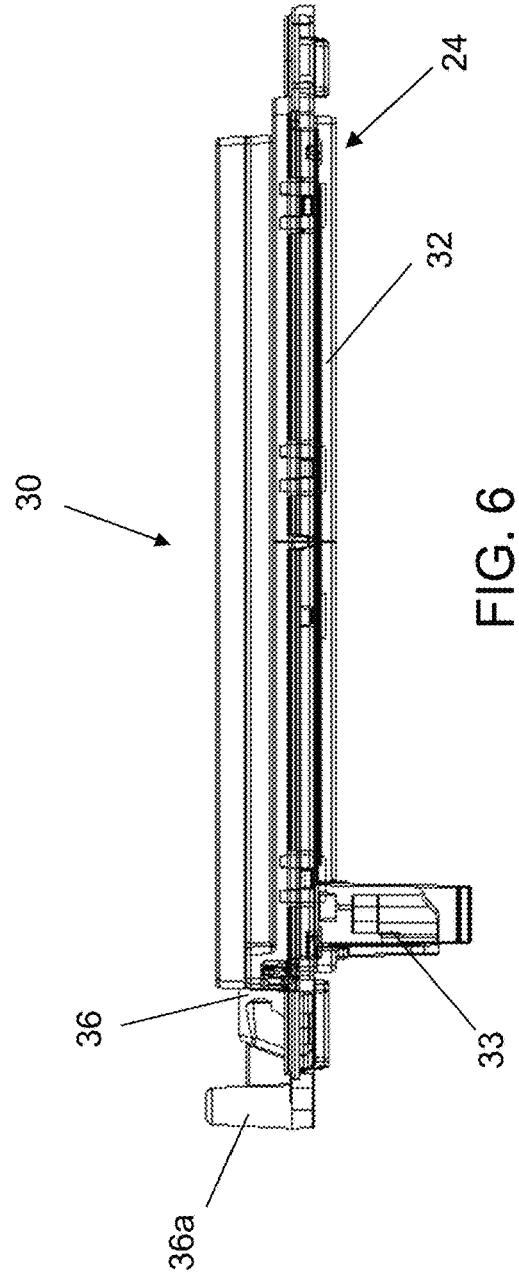
FIG. 6 is a side elevation of the shutoff module, shown in its retracted state.
Figure 7:
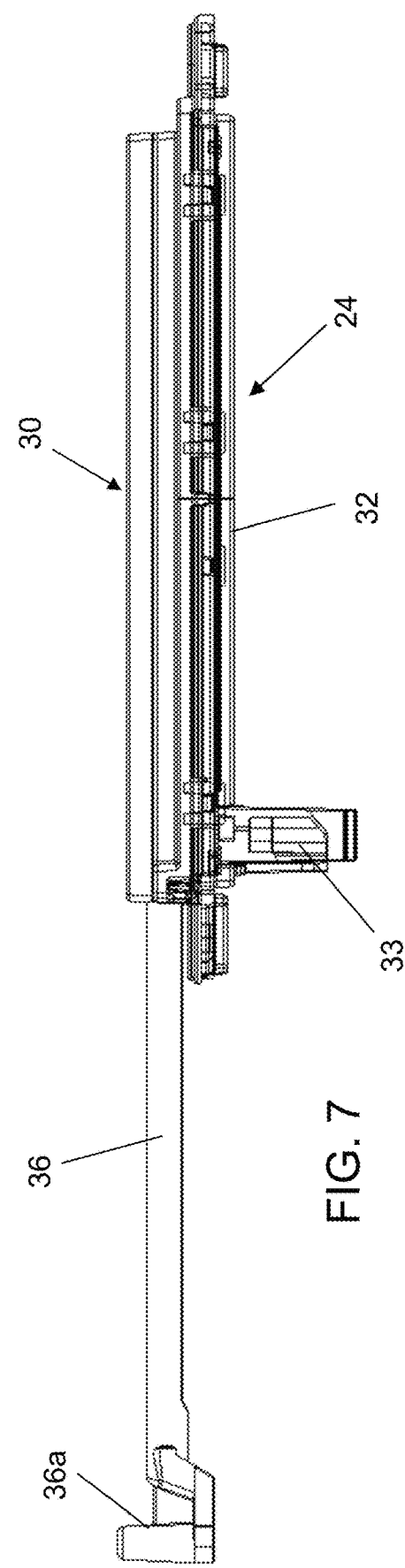
FIG. 7 is another side elevation of the shutoff module, shown in its extended state.
Figure 8:
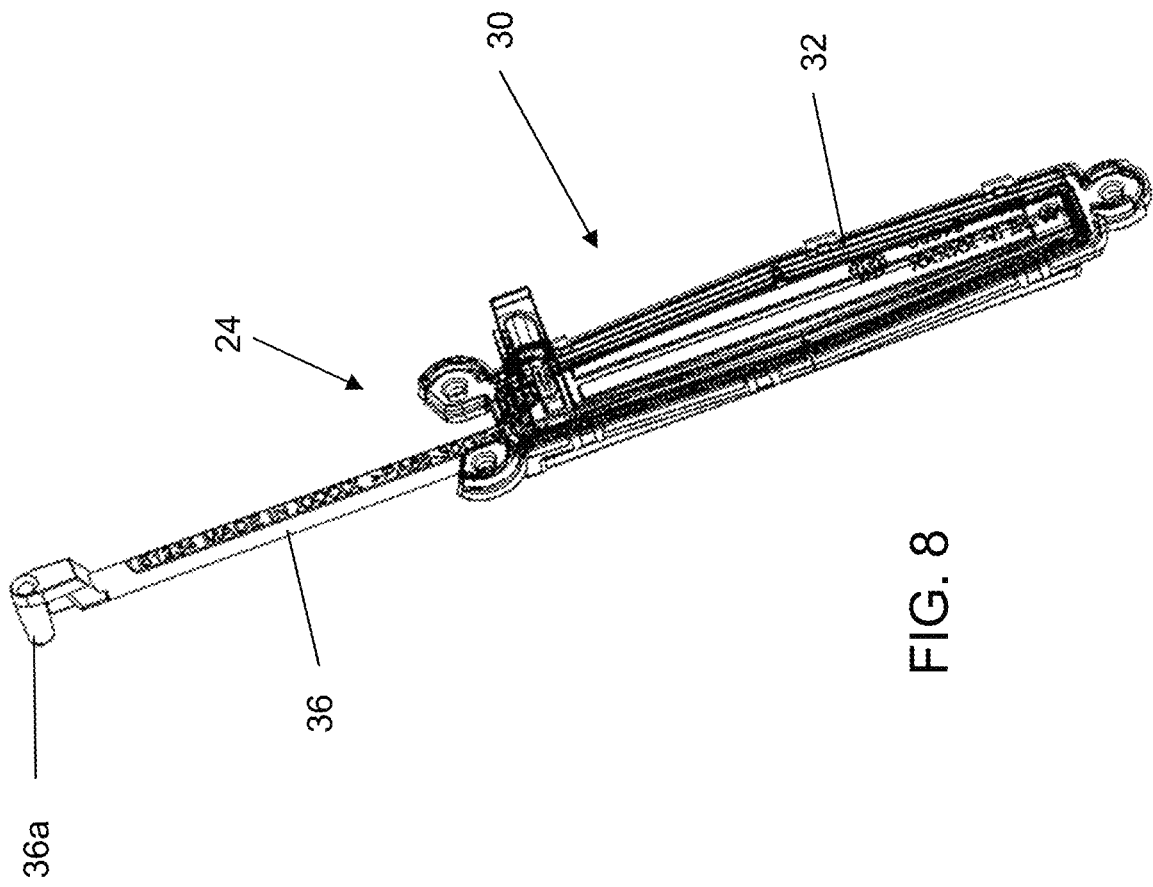
FIG. 8 is a perspective view of the shutoff module in its extended state.

As shown in FIGS. 4 and 5, the plunger is received in the housing of the body 32 when retracted, with an inner end 36*b* of the plunger 36 moving relative to and along the PCB 34 within the body 32 as the mirror head is moved along the support structure. The non-memory shutoff module 30 includes two shutoff switches or micro switches 38 (FIG. 9) mounted at or near either end of the PCB 34. The micro switches may be spaced apart by a distance representative of the extent of travel of the mirror head between the fully extended position and the fully retracted position. For example, the micro switches may be positioned at opposing ends of the PCB 34. The shutoff switches are activated by the plunger when the mirror head reaches either the fully extended position or the fully retracted position. The non-memory module automatically shuts off at either extreme position.

Figure 9:
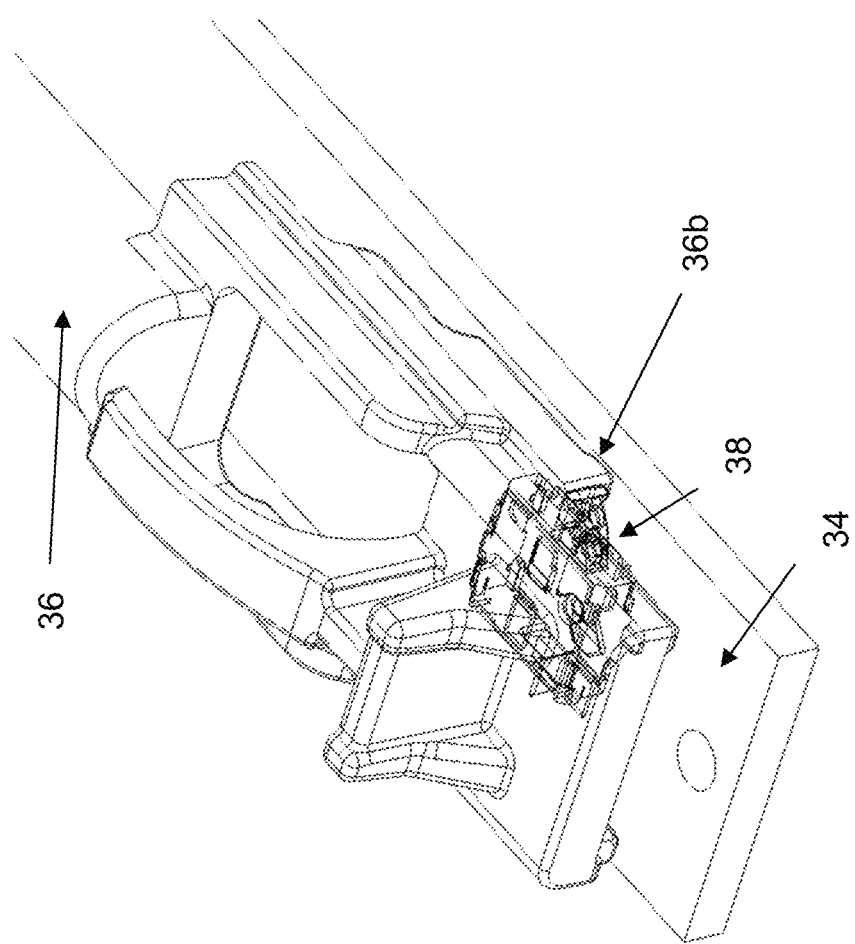
FIG. 9 is a perspective view of an end of the plunger of the shutoff module engaging a micro switch.

The body or housing 32 of the non-memory shutoff module 30 houses or encases or contains the PCB 34 within and between an upper housing portion and a lower housing portion. As shown in FIG. 9, the non-memory PCB 34 includes two micro switches (micro switch 38 shown at one end of the PCB 34 in FIG. 9, with the housing portions of the body removed) at or near opposite ends of the PCB. The plunger moves relative to the PCB and the housings and the micro switches 38 are activated when the plunger 36 reaches the end of travel in either the fully retracted position or the fully extended position of the mirror head. The inner end of the plunger includes an element or feature that is configured to engage and activate the respective micro switch. For example, the end of the plunger arrives at the respective micro switch at the end of travel toward the retracted position or the extended position and activates the respective micro switch. The inner end of the plunger activates one of the two micro switches when at either extreme end of travel, and the power extend or power retract function is stopped responsive to one of the micro switches being activated.

Optionally, a power extend/retract adjustment mechanism 124 for an exterior mirror with a memory feature may operate to extend/retract the mirror head to a particular preselected and saved position between the full-extend position and the full-retract position. In such a memory mirror application, the shutoff module or memory module may provide a tracking feature that determines the degree of extension/retraction of the mirror head, whereby the adjustment mechanism may operate (such as responsive to a user actuatable input in the vehicle) to extend or retract the mirror head to a particular preselected and saved position.

Figure 10:
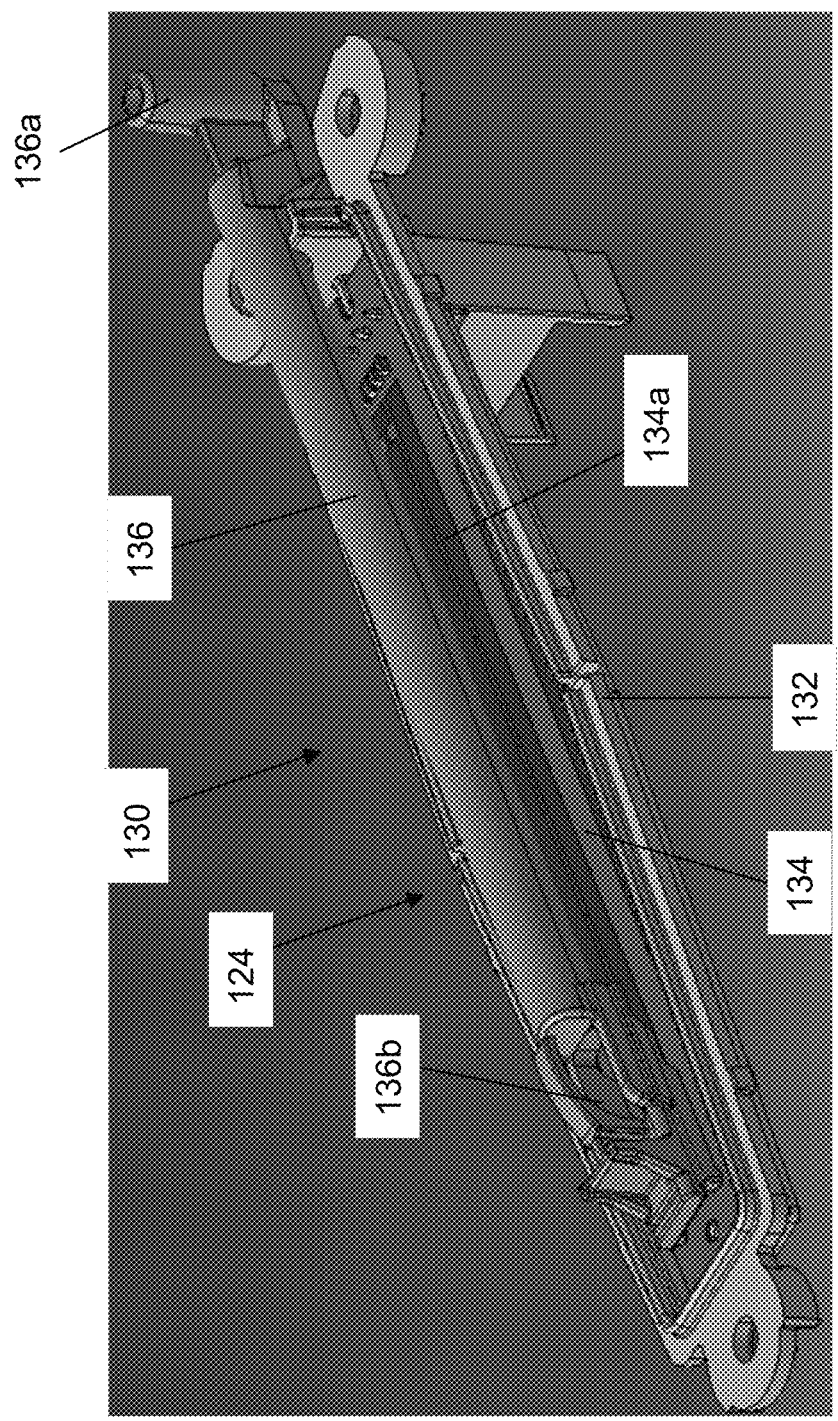
FIG. 10 is a perspective view of a memory module in its retracted state.
Figure 11:
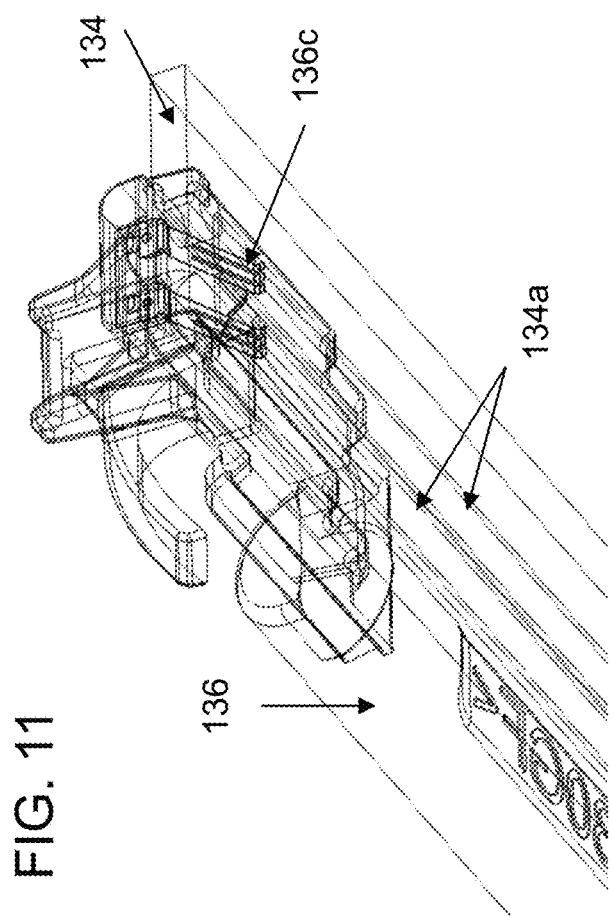
FIGS. 11 and 12 are views of the end of the plunger of the memory module, showing the electrical connection of the end of the plunger with electrically conductive traces along the circuit board of the module.
Figure 12:
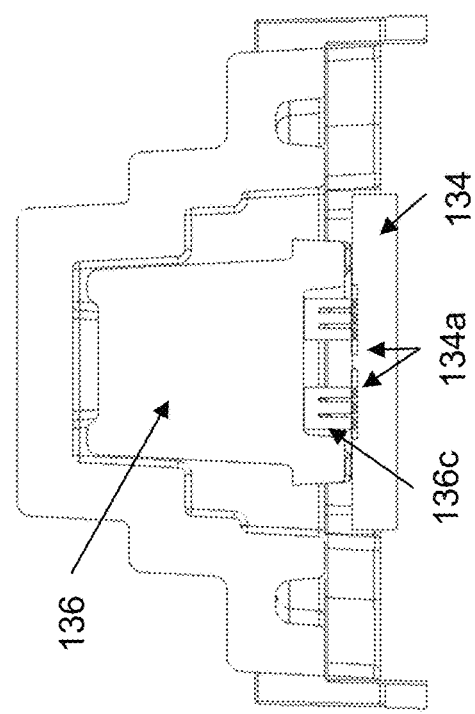

For example, and with reference to FIGS. 10-12, a memory shutoff module 130 includes a body or base portion 132 (including the housing portions that house or accommodate a printed circuit board or circuit or electrical element 134) that is rigidly attached to the head bracket (that moves with the mirror head relative to the support structure). The module also includes a sliding plunger 136 that is movably disposed at the body 132 and that is attached at a distal or outer end 136*a* to the support structure. As the mirror head extends and retracts along the support structure, the plunger 136 stays stationary relative to the support structure or arm or arms, and the body of the module moves in conjunction with the head bracket. The plunger and the module body move relative to one another, proportionally to the movement between the mirror head and arm, such as in a similar manner as described above with respect to module 30.

In the illustrated embodiments, the memory version of the module uses the same upper and lower housings as the non-memory version. The circuit board 134 includes two parallel spaced apart electrically conductive traces 134*a* (e.g., carbon-ink traces) and the inner end 136*b* of the plunger 136 has an electrically conductive metal element or stamping or metal wipers 136*c* that bridge the gap between and/or engages the two carbon ink traces (with the two traces being spaced apart and electrically isolated from one another). As shown in FIGS. 10-12, the memory module 130 (shown in FIGS. 11 and 12 without the housings) includes the PCB 134 with the two electrically conductive and electrically isolated carbon ink traces 134a. The plunger 136, which moves relative to the housings and the PCB, includes metal wipers 136c at its inner end 136b.

As the mirror head is extended/retracted, the metal wipers 136c electrically conductively contact and connect at and slide along the carbon ink traces 134a along the surface or side of the memory PCB. For example, the adjustment mechanism may stop movement of the mirror head at a stored position between a fully extended position and a fully retracted position responsive to determination that the inner end of the plunger is at a particular location along the electrically conductive traces that is representative of the mirror head being at the stored position. The carbon ink (or other suitable material) is an electrically resistive material, and there is a voltage difference applied to the two carbon ink traces by the memory system or adjustment system of the vehicle. The stamped metal wiper is connected to the inner end of the plunger, and the wiper acts as an electrically conductive bridge between the two carbon ink traces on the PCB. The position of the wiper along the carbon ink traces is determined by the variation of the voltage difference between the two ends of the carbon ink traces. The memory module, including the wipers and conductive traces, may utilize aspects of the memory mirror functions described in U.S. Publication No. US-2021-0323477, which is hereby incorporated herein by reference in its entirety.

Thus, the mirror assembly provides a shutoff module for an extendable and retractable exterior mirror. The body of the shutoff module is mounted at the mirror head, with the plunger attached at the support structure or mounting base, such that extension and retraction of the mirror head causes movement of the plunger relative to the body of the shutoff module.

The memory shutoff module 130 and non-memory shutoff module 30 are both configured for telescoping power extend trailer tow outside mirrors (or other mirrors that translationally move the mirror head relative to the support structure) and are designed as two interchangeable units that can both be used in such mirror applications. The memory module 130 can be used in mirror assemblies for vehicles that support positional memory storage and recall functions, while the non-memory shut-off module 30 can be used in mirror assemblies for vehicles that do not support positional memory storage and recall functions. Both the memory module and the non-memory module interface with the mirror assembly in the same way, and therefore either unit can be used in the mirror assembly without modification to the mirror structure. The plunger for the non-memory shut-off module is very similar to the memory version, except the non-memory version does not include the metal wipers and instead includes a feature that activates the micro switches. The non-memory module 30 (which automatically shuts off at either extreme position) thus uses the same upper and lower housings, and also uses the same plunger (with a small tool insert change), as the memory module 130.

Both the memory and non-memory units attach to the mirror assembly in the same way. The upper and lower housing portions are common between the memory module and non-memory module. The distal end of the plunger is fixed, such as, for example, via a threaded fastener or screw, to the stationary arm bracket of the mirror assembly, while the module body (housings and PCB) is fixed, such as, for example, via a plurality of threaded fasteners (such as three screws for the illustrated embodiment), to the extending/retracting head bracket. The module is connected electronically to the vehicle control via a wire harness or electrical connection at a sealed connector integrated into the housing.

Therefore, the mirror assembly provides an automatic shutoff and/or memory function for an extension/retraction mechanism or device that is operable to extend or retract or move the mirror head between its retracted and extended positions or states. The shutoff module generates a signal to deactivate the motor of the adjustment mechanism when the module determines that the mirror head is fully extended or fully retracted. The module may provide a memory position function, whereby the adjustment mechanism may extend/retract the mirror head to a preselected and saved position between the fully extended position and the fully retracted position.

The mirror assembly may comprise any suitable mirror assembly or structure or housing. Optionally, the mirror assembly may utilize aspects of the mirror assemblies described in U.S. Pat. Nos. 11,148,596; 10,099,618; 9,827,913; 9,796,334; 8,915,601; 7,267,449; 6,394,616 and/or 6,213,609, and/or U.S. Publication Nos. US-2021-0331625; US-2021-0316664; US-2021-0213880 and/or US-2015-0224930, which are hereby incorporated herein by reference in their entireties. Optionally, the exterior rearview mirror assembly may include a spotter mirror element to provide a wide angle rearward field of view to the driver of the vehicle equipped with the mirror assembly. The spotter mirror element may utilize aspects of the mirrors described in U.S. Pat. Nos. 8,917,437; 7,255,451; 7,195,381; 6,717,712; 7,126,456; 6,315,419; 7,097,312; 6,522,451; 6,315,419; 5,080,492; 5,050,977; 5,033,835; 8,736,940; 8,021,005; 7,934,844; 7,887,204; 7,824,045 and/or 7,748,856, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular exterior rearview mirror assembly, the vehicular exterior rearview mirror assembly comprising:
    a mirror head accommodating a mirror reflective element;
    a support structure having an inboard end and an outboard end, wherein the inboard end of the support structure is configured for attachment at a side of a vehicle equipped with the vehicular exterior rearview mirror assembly, and wherein the support structure, with the inboard end of the support structure attached at the side of the vehicle, extends laterally from the side of the vehicle;
    wherein the mirror head is movably mounted at the support structure;
    an adjustment mechanism comprising an electrically operable motor, wherein, with the inboard end of the support structure attached at the side of the vehicle and when the electrically operable motor is electrically operated, the adjustment mechanism operates to move the mirror head along the support structure between a retracted position, where the mirror head is closer to the side of the vehicle at which the support structure is attached, and an extended position, where the mirror head is further from the side of the vehicle at which the support structure is attached;
    a shutoff device disposed at the mirror head, wherein the shutoff device comprises a base portion and a movable portion movably disposed at the base portion, and wherein the movable portion has an inner end disposed within the base portion and an outer end opposite the inner end;

wherein, with the adjustment mechanism operating to move the mirror head along the support structure, the movable portion moves relative to the base portion;

wherein, with the adjustment mechanism operating to move the mirror head along the support structure toward the retracted position, the shutoff device stops movement of the mirror head responsive to the movable portion engaging a first micro switch at a first end region of the base portion; and wherein, with the adjustment mechanism operating to move the mirror head along the support structure toward the extended position, the shutoff device stops movement of the mirror head responsive to the movable portion engaging a second micro switch at a second end region of the base portion that is opposite the first end region of the base portion.

2. The vehicular exterior rearview mirror assembly of claim 1, wherein the base portion is attached at the mirror head and the outer end of the movable portion is attached at the support structure.

3. The vehicular exterior rearview mirror assembly of claim 1, wherein the base portion is attached at the support structure and the outer end of the movable portion is attached at the mirror head.

4. The vehicular exterior rearview mirror assembly of claim 1, wherein, with the adjustment mechanism operating to move the mirror head along the support structure, the inner end of the movable portion moves relative to and along an electrical element of the base portion.

5. The vehicular exterior rearview mirror assembly of claim 4, wherein the electrical element comprises a pair of spaced apart electrically conductive traces established along a surface of the electrical element, and wherein the inner end of the movable portion comprises an electrically conductive element that engages the pair of spaced apart electrically conductive traces and moves along the electrically conductive traces as the mirror head is extended and retracted.

6. The vehicular exterior rearview mirror assembly of claim 5, wherein the shutoff device stops movement of the mirror head at a stored position between the extended position and the retracted position responsive to determination that the inner end of the movable portion is at a particular location along the electrically conductive traces that is representative of the mirror head being at the stored position.

7. The vehicular exterior rearview mirror assembly of claim 1, wherein the mirror head is movable relative to a support bracket disposed at the outboard end of the support structure that is distal from the inboard end.

8. The vehicular exterior rearview mirror assembly of claim 1, wherein the mirror head is movable relative to a bracket disposed at the outboard end of the support structure that is distal from the inboard end, and wherein the base portion is attached at the mirror head and the outer end of the movable portion is attached at the bracket.

9. The vehicular exterior rearview mirror assembly of claim 1, wherein the adjustment mechanism is disposed at the outboard end of the support structure that is distal from the inboard end.

10. The vehicular exterior rearview mirror assembly of claim 1, wherein the electrically operated motor is electrically operated responsive to actuation of a user input disposed in the vehicle, and wherein the user input is actuatable by a driver of the vehicle at which the vehicular exterior rearview mirror assembly is attached.

11. The vehicular exterior rearview mirror assembly of claim 1, wherein the support structure comprises a pair of support arms that are parallel to one another and that, with the inboard end of the support structure attached at the side of the vehicle, extend laterally from the side of the vehicle.

12. A vehicular exterior rearview mirror assembly, the vehicular exterior rearview mirror assembly comprising:

a mirror head accommodating a mirror reflective element;

a support structure having an inboard end and an outboard end, wherein the inboard end of the support structure is configured for attachment at a side of a vehicle equipped with the vehicular exterior rearview mirror assembly, and wherein the support structure, with the inboard end of the support structure attached at the side of the vehicle, extends laterally from the side of the vehicle;

wherein the mirror head is movably mounted at the support structure;

an adjustment mechanism comprising an electrically operable motor, wherein, with the inboard end of the support structure attached at the side of the vehicle and when the electrically operable motor is electrically operated, the adjustment mechanism operates to move the mirror head along the support structure between a retracted position, where the mirror head is closer to the side of the vehicle at which the support structure is attached, and an extended position, where the mirror head is further from the side of the vehicle at which the support structure is attached;

a shutoff device disposed at the mirror head, wherein the shutoff device comprises a base portion and a movable portion movably disposed at the base portion, and wherein the movable portion has an inner end disposed within the base portion and an outer end opposite the inner end;

wherein, with the adjustment mechanism operating to move the mirror head along the support structure, the movable portion moves relative to the base portion; and wherein, with the adjustment mechanism operating to move the mirror head along the support structure, the inner end of the movable portion moves relative to and along electrically conductive traces established along the base portion, and wherein the inner end of the movable portion comprises an electrically conductive element that engages the electrically conductive traces and moves along the electrically conductive traces as the mirror head is extended and retracted.

13. The vehicular exterior rearview mirror assembly of claim 12, wherein the base portion is attached at the mirror head and the outer end of the movable portion is attached at the support structure.

14. The vehicular exterior rearview mirror assembly of claim 12, wherein the base portion is attached at the support structure and the outer end of the movable portion is attached at the mirror head.

15. The vehicular exterior rearview mirror assembly of claim 12, wherein the electrically conductive traces comprise a pair of spaced apart electrically conductive traces established along an electrical element of the base portion.

16. The vehicular exterior rearview mirror assembly of claim 12, wherein the shutoff device is operable to stop movement of the mirror head at the extended position and at the retracted position responsive to determination that the inner end of the movable portion is at a respective particular location along the electrically conductive traces that is representative of the mirror head being at the extended position or the retracted position.

17. The vehicular exterior rearview mirror assembly of claim 16, wherein the shutoff device is operable to stop movement of the mirror head at a stored position between the extended position and the retracted position responsive to determination that the inner end of the movable portion is at a particular location along the electrically conductive traces that is representative of the mirror head being at the stored position.

18. The vehicular exterior rearview mirror assembly of claim 12, wherein the mirror head is movable relative to a support bracket disposed at the outboard end of the support structure that is distal from the inboard end.

19. The vehicular exterior rearview mirror assembly of claim 12, wherein the mirror head is movable relative to a bracket disposed at the outboard end of the support structure that is distal from the inboard end, and wherein the base portion is attached at the mirror head and the outer end of the movable portion is attached at the bracket.

20. The vehicular exterior rearview mirror assembly of claim 12, wherein the adjustment mechanism is disposed at the outboard end of the support structure that is distal from the inboard end.

21. The vehicular exterior rearview mirror assembly of claim 12, wherein the electrically operated motor is electrically operated responsive to actuation of a user input disposed in the vehicle, and wherein the user input is actuatable by a driver of the vehicle at which the vehicular exterior rearview mirror assembly is attached.

22. The vehicular exterior rearview mirror assembly of claim 12, wherein the support structure comprises a pair of support arms that are parallel to one another and that, with the inboard end of the support structure attached at the side of the vehicle, extend laterally from the side of the vehicle.

23. A vehicular exterior rearview mirror assembly, the vehicular exterior rearview mirror assembly comprising:
a mirror head accommodating a mirror reflective element;
a support structure having an inboard end and an outboard end, wherein the inboard end of the support structure is configured for attachment at a side of a vehicle equipped with the vehicular exterior rearview mirror assembly, and wherein the support structure, with the inboard end of the support structure attached at the side of the vehicle, extends laterally from the side of the vehicle;
wherein the mirror head is movably mounted at the support structure;
an adjustment mechanism comprising an electrically operable motor, wherein, with the inboard end of the support structure attached at the side of the vehicle and when the electrically operable motor is electrically operated, the adjustment mechanism operates to move the mirror head along the support structure between a retracted position, where the mirror head is closer to the side of the vehicle at which the support structure is attached, and an extended position, where the mirror head is further from the side of the vehicle at which the support structure is attached;
a shutoff device disposed at the mirror head, wherein the shutoff device comprises a base portion and a movable portion movably disposed at the base portion, and wherein the movable portion has an inner end disposed within the base portion and an outer end opposite the inner end;
wherein, with the adjustment mechanism operating to move the mirror head along the support structure, the movable portion moves relative to the base portion; and
wherein, with the adjustment mechanism operating to move the mirror head along the support structure toward the retracted position, the shutoff device is operable to stop movement of the mirror head (i) responsive to the movable portion reaching a first electrical element at a first end region of the base portion, (ii) responsive to the movable portion reaching a second electrical element at a second end region of the base portion that is opposite the first end region and (iii) responsive to the movable portion reaching a third electrical element at a third region of the base portion that is between the first end region and the second end region.

24. The vehicular exterior rearview mirror assembly of claim 23, wherein the base portion is attached at the mirror head and the outer end of the movable portion is attached at the support structure.

25. The vehicular exterior rearview mirror assembly of claim 23, wherein the base portion is attached at the support structure and the outer end of the movable portion is attached at the mirror head.

26. The vehicular exterior rearview mirror assembly of claim 23, wherein, with the adjustment mechanism operating to move the mirror head along the support structure, the inner end of the movable portion moves relative to and along electrically conductive traces established along the base portion, and wherein the first electrical element is at a first end of the electrically conductive traces and the second electrical element is at a second end of the electrically conductive traces.

27. The vehicular exterior rearview mirror assembly of claim 26, wherein the shutoff device is operable to stop movement of the mirror head responsive to the movable portion reaching a third electrical element at a third region of the base portion based at least in part on determination that the inner end of the movable portion is at a particular location along the electrically conductive traces.

28. The vehicular exterior rearview mirror assembly of claim 23, wherein the electrically operated motor is electrically operated responsive to actuation of a user input disposed in the vehicle, and wherein the user input is actuatable by a driver of the vehicle at which the vehicular exterior rearview mirror assembly is attached.

29. The vehicular exterior rearview mirror assembly of claim 23, wherein the support structure comprises a pair of support arms that are parallel to one another and that, with the inboard end of the support structure attached at the side of the vehicle, extend laterally from the side of the vehicle.

* * * * *

UNITED STATES PATENT AND TRADEMARK OFFICE
CERTIFICATE OF CORRECTION

| | | |
|---|---|---|
| PATENT NO. | : 12,214,728 B2 | Page 1 of 1 |
| APPLICATION NO. | : 18/543039 | |
| DATED | : February 4, 2025 | |
| INVENTOR(S) | : Matthew V. Steffes | |

It is certified that error appears in the above-identified patent and that said Letters Patent is hereby corrected as shown below:

On the Title Page

Item (73) In the Assignee section, "Magna Mirros of America, Inc." should be --Magna Mirrors of America, Inc.--

Signed and Sealed this
Eleventh Day of March, 2025

Coke Morgan Stewart
*Acting Director of the United States Patent and Trademark Office*